(12) United States Patent
Turner

(10) Patent No.: US 8,087,844 B2
(45) Date of Patent: Jan. 3, 2012

(54) POLAR ENERGY AIR GLIDE FISHING SWIVEL

(75) Inventor: Randal Scott Turner, Granite falls, WA (US)

(73) Assignee: Randal Scott Turner, Granite falls, WA (US)

( * ) Notice: Subject to any disclaimer, the term of this patent is extended or adjusted under 35 U.S.C. 154(b) by 197 days.

(21) Appl. No.: 12/647,184

(22) Filed: Dec. 24, 2009

(65) Prior Publication Data

US 2011/0154716 A1  Jun. 30, 2011

(51) Int. Cl.
*A01K 91/03* (2006.01)

(52) U.S. Cl. .............. 403/165; 403/78; 403/DIG. 1

(58) Field of Classification Search ............ 403/78, 403/119, 165, DIG. 1; 43/43.1, 42.49; 310/90.5; 384/446

See application file for complete search history.

(56) References Cited

U.S. PATENT DOCUMENTS

| | | | | |
|---|---|---|---|---|
| 2,384,490 A * | 9/1945 | Plum et al. | | 403/31 |
| 2,466,243 A * | 4/1949 | Johnson | | 59/95 |
| 2,772,902 A * | 12/1956 | Lind | | 403/165 |
| 3,178,881 A * | 4/1965 | Welch | | 59/95 |
| 3,836,268 A * | 9/1974 | Behnke | | 403/165 |
| 4,308,419 A * | 12/1981 | Fredriksson | | 174/185 |
| 5,461,820 A * | 10/1995 | Sorola | | 43/43.1 |
| 5,529,421 A * | 6/1996 | Epkens | | 403/164 |
| 6,301,822 B1 * | 10/2001 | Zernov | | 43/42.31 |
| 6,637,969 B2 * | 10/2003 | Crane et al. | | 403/78 |
| 6,848,288 B1 * | 2/2005 | Derman | | 70/459 |
| 7,513,075 B2 * | 4/2009 | Garber | | 43/42.19 |
| 2007/0031183 A1 * | 2/2007 | Sim | | 403/78 |

FOREIGN PATENT DOCUMENTS

JP  2010119377 A * 6/2010

* cited by examiner

*Primary Examiner* — Joshua Kennedy

(57) ABSTRACT

A swivel for connecting a fishing line to fishing lure or other terminal tackle having a main body with one open end and cavity running through the axis of for inserting a coupler into. a rod of which has an eyelet on one end and head on the opposite end which is larger than said rod shaft yet small enough to fit into said main body cavity. Two neodymium ring magnets and rubber ring washers which fit onto said rod and are inserted into said main body cavity after which a male compression fitting is inserted into said main body cavity and compressed over ridges on the end cap securing all parts within said main body. The rod shaft spins freely within by using the opposing magnetic poles of the neodymium ring magnets as an air bearing which creates zero friction from moving parts removing any possibility of swivel seizure due to ball bearings wearing out which is common with bearing swivels.

7 Claims, 4 Drawing Sheets

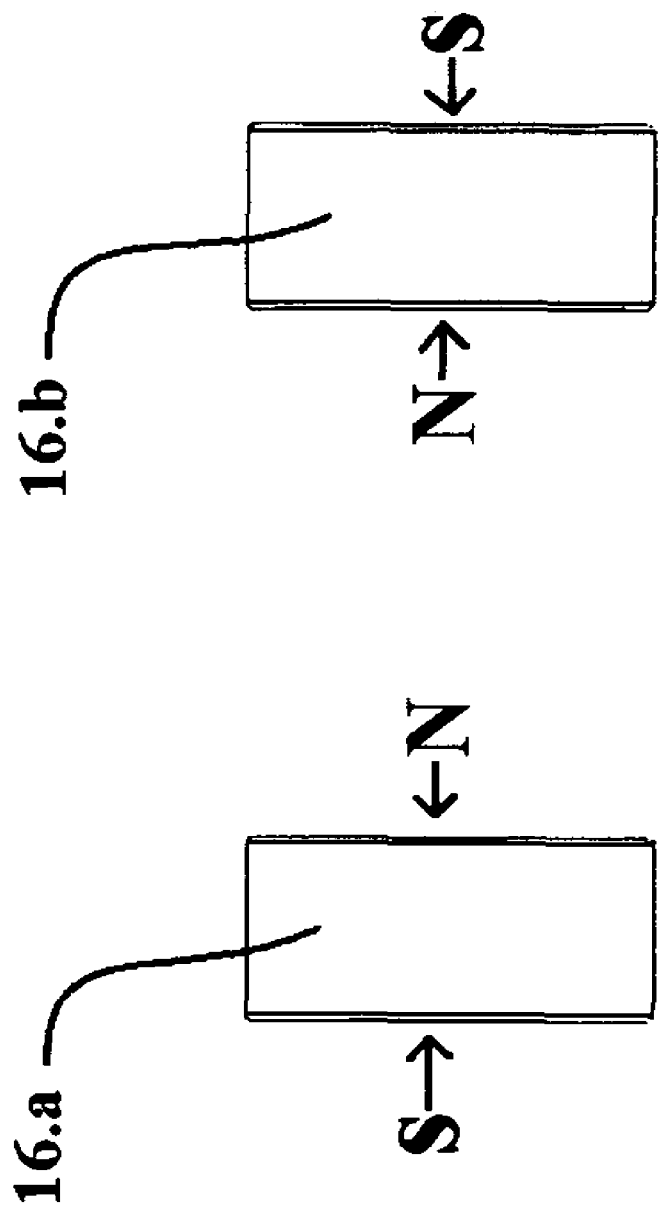

POLAR ENERGY AIR GLIDE FISHING SWIVEL

BACKGROUND OF THE INVENTION

1. Field of Invention

The present invention relates to fishing swivel construction. used in fishing to fasten fishing lures or other terminal tackle to a fishing line and more particularly to a swivel which has the least resistance between moving parts allowing the lure or other apparatus attached to said swivel to glide freely on polar energy repulsion, getting the best possible swimming motion without drag from bearings and which does not require lubrication between parts.

2. Related Art

There are many examples of swivels which secure lures, dodgers, and other forms of bait to a fishing line allowing a lure or other apparatus to move freely and avoid line twisting and tangling. The known swivels conventionally comprise a body composed of two or more parts having eyelets at opposite ends thereof. The parts conventionally are formed of corrosion resistant material, such as stainless steel or brass. The ability of parts of the body to rotate makes it possible for a lure to be drawn through a body of water without twisting and tangling fishing line and allow the lure to swim or spin without causing the fishing line to rotate. One of the problems associated with known swivels is that they tend to seize up when in use due to age or debris/silt getting inside the bearings slowing and or seizing the swivels movement.

Accordingly, there exists a need for a fishing swivel that will not seize up during use from worn bearings or debris/silt getting clogged inside ball bearings Swivel joints require two masses rotate axially with respect to one another with the least possible energy loss due to friction.

SUMMARY OF THE INVENTION

The present invention solves these problems by using non magnetic stainless steel, brass or like material and incorporating ring magnets onto a middle rod with the magnetic poles repelling each other acting as a polar air/energy cushion which has the least amount of friction between moving parts possible and does not require lubrication.

Broadly, the swivel assembly comprises a main body having an axially spaced cavity therein of which is accommodated a set of neodymium ring magnets with rubber washers within that are threaded onto a rod shaft with a head on one end of larger diameter that said shaft, the shaft extends through and protrudes out of a compression coupled end cap. The swivel has an eyelet on the top of said main body, and the small end of said rod shaft for attaching fishing lure or line.

By utilizing the north and south magnetic poles aligned on the two ring magnets so that they oppose one another forcing one magnet to push against said rod shaft head and the second ring magnet pushing against said coupled end cap which is compressed onto the main body after rod shaft with magnets and washers assembly is inserted into the main body, this polar repulsion of the magnets allows the swivel rod shaft to spin freely without drag like conventional bearing swivels have.

A non magnetic stainless steel bearing may also be inserted into the assembly as a backup if said magnetic pole tensile force reaches its limit, the bearing will kick in allowing swivel to spin while the tensile force is over limit for the magnetic field repulsion.

These and other features and advantages of the invention will be more fully understood from a reading of the following detailed description with reference to the accompanying drawings.

BRIEF DESCRIPTION OF DRAWINGS

FIG. 4 is a side view of the two neodymium ring magnets showing the magnetic field alignment thereof when inside the swivel body housing.

DETAILED DESCRIPTION OF DRAWINGS

Figure 1:
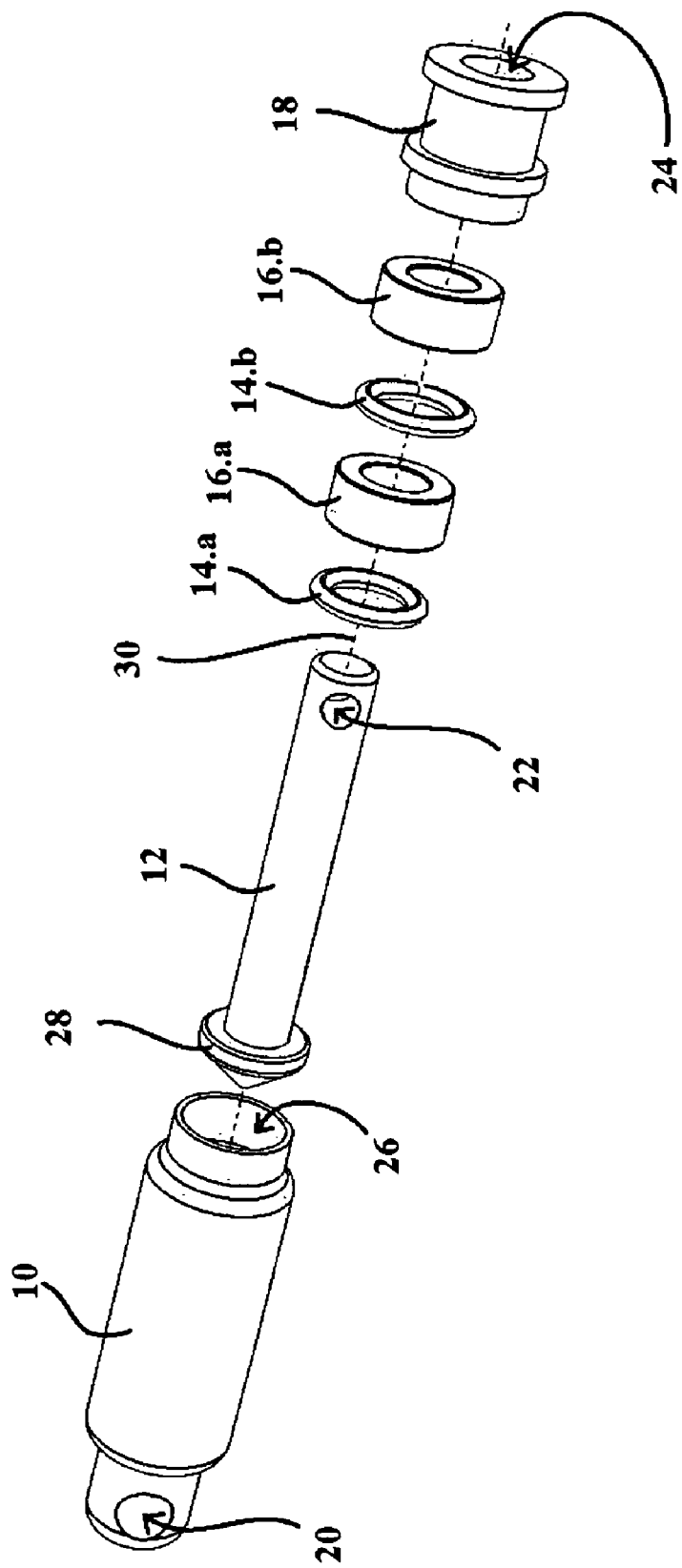
FIG. 1 is an exploded view of the fishing swivel assembly showing the components thereof in greater detail.
Figure 2:
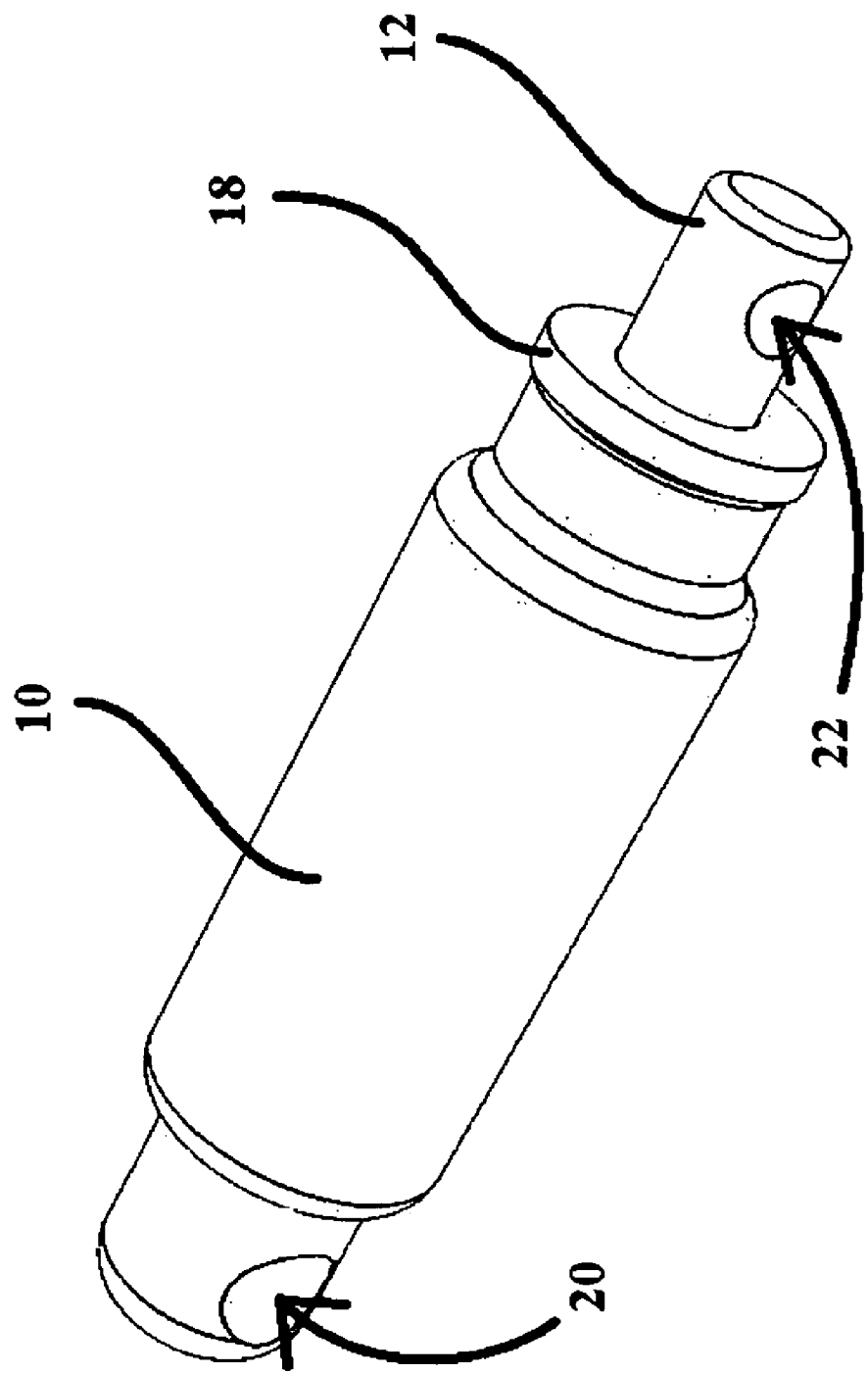
FIG. 2 is a perspective side view of the fishing swivel showing the assembled swivel.

FIG. 1 shows an exploded view of the swivel assembly in accordance with the present invention; The swivel is made up of (8) principal sub-assemblies, i.e., a main body segment (10) an end cap (18) a rod shaft (12) two rubber ring washers (14a, 14b) two neodymium ring magnets (16a, 16b) and may include ball bearings (34).

As can be seen in FIG. 1, parts (14a, 14b, 16a, 16b) are threaded along the center line (30) onto rod shaft (12) coming to rest against shaft head (28). As can be seen in FIG. 4, the north and south poles of the magnetic field are positioned to repel part (16a) away from part (16b) when threaded onto rod shaft (12) and inserted into sleeve (24) prior to sliding end cap (18) down to rest upon ring magnet (16b) all parts are then inserted into cavity (26) while the end cap (18) is positioned with half of body (18) protruding from cavity (26) and compressed with compression clamp around the outer thin sleeve surface of the cavity ridge (26) compressing the main body segment (10) onto cap (18) securing parts within main body (10).

Holes (20) and (22) are used for attaching fishing line, fishing lure or other terminal tackle used for fishing.

The outer diameter of rod shaft (12) is slightly smaller than inner diameter hole (24) allowing rod shaft (12) to swivel freely.

FIG. 4 is a side view of the ring magnets (16a, 16b) showing alignment of the North and South poles on the ring magnets (16a, 16b) having north to north poles aligned facing one another so to repel ring magnet (16) away from ring magnet (16b).

Figure 3:
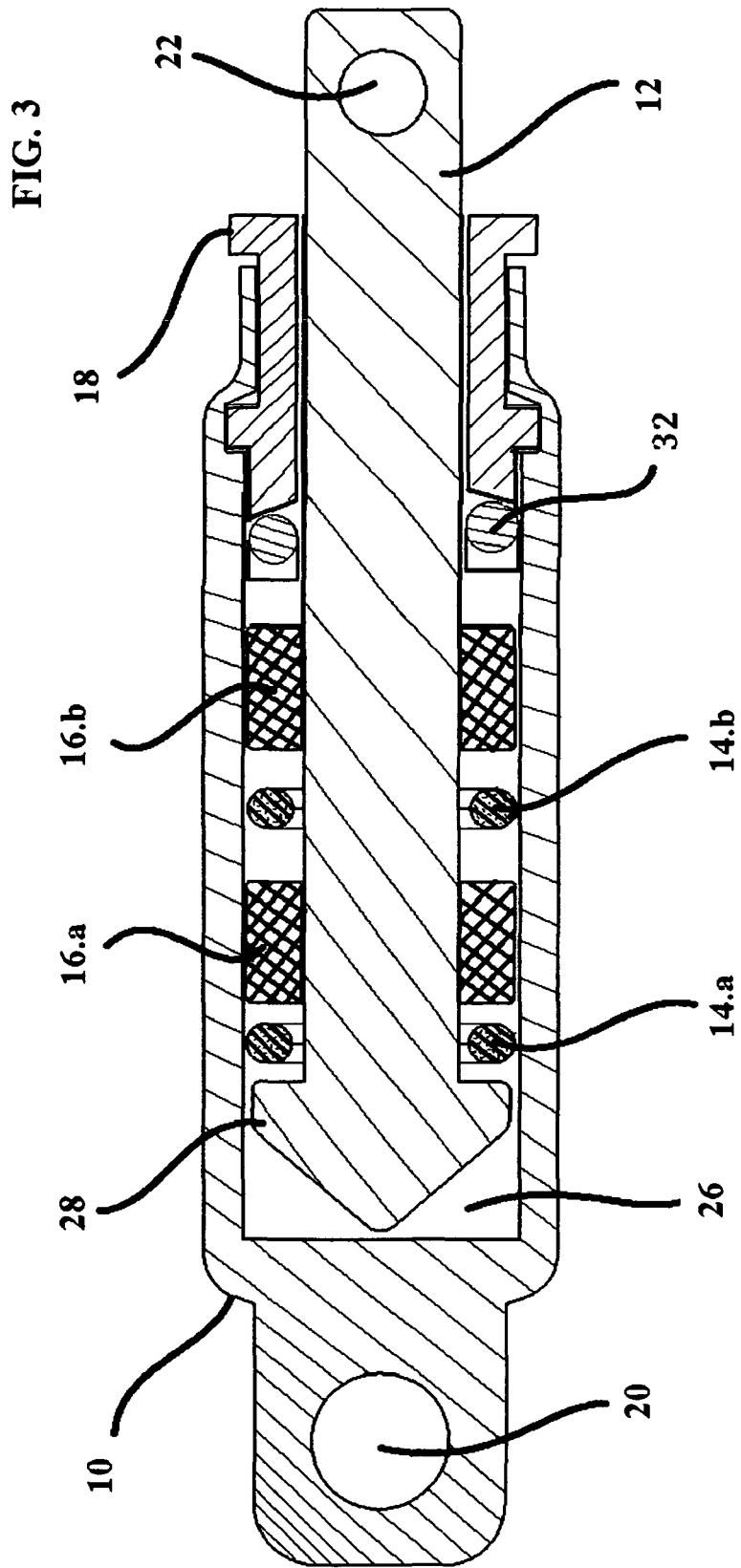
FIG. 3 is a cut section side view of the fishing swivel showing how each component rests within after assembled together.

FIG. 3 shows a side sectioned view of the present invention in an alternate configuration, having ball bearings (32) incorporated of which are activated when tensile strength upon rod shaft (12) exceeds magnetic repulsion field strength which also distributes any lateral forces placed upon shaft (12) to the ball bearings (32) allowing the shaft (12) to remain spinning when magnetic field repulsion strength is exceeded on ring magnets (16a, 16b).

What is claimed is:

1. A fishing swivel, comprising; a cylindrical main body comprising a closed end at one end and a cavity opening at the other end and a sleeve of thinner thickness defining a rim area of said cavity opening; a rod shaft comprising a first end having a head of larger diameter and a second end; two rubber ring washers and two neodymium ring magnets alternately arranged on said rod shaft after, being threaded onto said rod shaft and forced to the first end to such that one of the ring washers rests against the head of the rod shaft; an end cap having a hole running through a center thereof such that the second end of the rod shaft is inserted therethrough said rod shaft, said rubber ring washers, said ring magnets and said end cap being located within said cylindrical main body;

wherein said sleeve of thinner thickness is compressed onto said end cap such that said rubber ring washers and said ring magnets are encapsulated within said cylindrical main body;

said rod shaft having said head of larger diameter than said rod shaft on one end with so to keep said rod shaft from pulling out of said cylindrical main body after said end cap is compressed onto said main body;

wherein said neodymium ring magnets are aligned to repel one another allowing said rod shaft to spin freely within said main body.

2. The fishing swivel of claim 1, further comprising eyelets at each end of the fishing swivel for attaching fishing line or other terminal tackle.

3. The fishing swivel of claim 1, wherein said neodymium ring magnets are arranged on said rod shaft such that north and south magnetic poles are aligned to repel one another which forces said rod shaft head towards the closed end of said cylindrical main body cavity allowing said rod shaft to spin freely within said main body after said end cap is coupled to said main body portion.

4. The fishing swivel of claim 1, wherein said hole of said end cap portion has a slightly larger diameter than said rod shaft allowing the rod shaft room to move and spin freely within said main body portion and said end cap.

5. The fishing swivel of claim 1, wherein said rubber washers threaded between said neodymium ring magnets act as cushions so that said magnets do not fracture as a result of opposing axial forces on the swivel.

6. The fishing swivel of claim 1, wherein said two neodymium magnets with magnetic poles are aligned to repel one another when threaded onto the center rod shaft so as to force one ring magnet to push against a rod shaft head forcing it towards the end wall inside the main body housing while the second ring magnet is forced to rest against the end cap.

7. The fishing swivel of claim 1, further comprising a bearing within said main body portion to allow said swivel to spin if tensile force surpasses a magnetic pole resistance capacity of said ring magnets.

\* \* \* \* \*